3,059,033
DOUBLE HYDRATES

Samuel Aaron Miller, 23 The Drive, London NW. 11, England, and John George Waller, 6 Kayemoor Road, Sutton, Surrey, England
No Drawing. Filed Mar. 31, 1961, Ser. No. 113,971
2 Claims. (Cl. 260—652)

This invention relates to new chemical compounds of the rare gases, argon, krypton and xenon.

According to one aspect of the present invention, there are provided double hydrates of the formula:

$$B.2R.17H_2O$$

where B is a liquid chlorinated derivative of methane and R is argon, krypton, or xenon. The liquid chlorinated derivatives of methane are methylene dichloride, $CH_2Cl_2$; chloroform, $CHCl_3$; and carbon tetrachloride, $CCl_4$.

According to another aspect of the invention, a method of preparing double hydrates of the formula:

$$B.2R.17H_2O$$

where B is a liquid chlorinated derivative of methane and R is argon, krypton, or xenon, comprises bubbling the rare gas under pressure through an emulsion of the chlorinate derivative in water containing a small amount of an emulsifying agent, such as sodium dodecylbenzenesulphonate, the emulsion being cooled to a temperature below the decomposition temperature of the compound at the pressure used, such that the emulsion remains sufficiently mobile to permit the rare gas to be bubbled therethrough.

The compounds are obtained in the form of white solids which are microcrystalline.

The temperatures at which the decomposition pressure is one atmosphere have been determined and are as follows:

|           | $CH_2Cl_2$ | $CHCl_3$ | $CCl_4$ |
|-----------|-----------|----------|---------|
| Argon, °C    | −7.0      | −4.8     | −1.6    |
| Krypton, °C  | +6.2      | +9.0     | +11.3   |
| Xenon, °C    | +8.6      | +10.9    | +13.7   |

X-ray examination has shown that the new compounds are of the type known as "inclusion" compounds in which the crystal lattice of one component (water) has cavities which can trap molecules of other components which are of the correct molecular free diameter to be retained in the cavity. The compounds are complex cubic structures consisting of one molecule of the liquid chlorinated methane derivative, two molecules of the rare gas, and seventeen water molecules. The argon compounds with methylene dichloride and carbon tetrachloride have unit cell dimensions of 17.3–17.35 and 17.4–17.5 A. respectively. The X-ray data are in agreement with the structures given above.

The double hydrates of the present invention are useful in the separation, purification and transport of the rare gases.

The invention is illustrated by the following examples:

Example 1

The argon-methylene dichloride compound, $$CH_2Cl_2.2Ar.17H_2O$$

was prepared by placing an emulsion containing 82 ml. of water, 17 ml. of methylene dichloride and 1 ml. of a 1% solution of sodium dodecylbenzenesulphonate in a cylindrical pressure vessel and pressurising to 400 atm. with argon. The gas inlet to the vessel was through a tube which passed under the surface of the liquid to a level near the bottom of the vessel. The vessel and its contents were cooled to −10° C. and the liquid was agitated by allowing some gas to escape whilst maintaining the pressure at the inlet. After 3 hours, the preparation was stopped and the pressure in the vessel was released. On opening the vessel, a solid white block of hydrate was found to have been formed. A sample of the white solid was transferred to a test tube and a stopper carrying a tube connected to a gas burette was inserted. The hydrate was allowed to decompose, and the volume of gas evolved was measured and the weight or residual liquid determined. It was found that 123 ml. of gas were evolved for each gram of residual liquid. Thus, in the argon-methylene dichloride compound, 1 ml. of 17% v./v. aqueous methylene dichloride emulsion, equivalent to 1.075 g., was associated with 123 ml. of gas. These figures are in good agreement with the formula, $CH_2Cl_2.2Ar.17H_2O$.

Example 2

The argon-carbon tetrachloride compound, $$CCl_4.2Ar.17H_2O$$

was similarly prepared as a solid block by the method described in Example 1, using an initial emulsion of 75 ml. of water, 24 ml. of carbon tetrachloride and 1 ml. of a 1% solution of sodium dodecylbenzenesulphonate.

Example 3

This example illustrates the use of the double hydrates of the present invention to the separation of krypton and xenon.

The rare gases krypton and xenon, which are becoming of increasing industrial importance, particularly in the electric lamp industry and for filling certain types of electronic tubes and flash-bulbs, are obtained from atmospheric air as by-products in the commercial production of oxygen and nitrogen. From a conventional low-temperature air-separation plant, they are obtained in the form of a mixture with a considerable excess of oxygen. The atmosphere contains about 1.15 parts per million by volume of krypton and 0.085 part per million of xenon. It is possible to operate a typical air-separation plant in such a way that a mixture of oxygen, krypton and xenon may be extracted which contains 96–98% of oxygen and 2–4% of krypton plus xenon. The bulk of the oxygen may be removed chemically, for example by adding enough pure hydrogen to combine with most of the oxygen, passing the mixture over a suitable catalyst, and condensing out most of the water so formed. This will leave a mixture containing say, 10% of oxygen, 83.8% of krypton, 6.2% of xenon, with traces of other impurities such as nitrogen, argon and methane. Krypton and xenon were separated from such a crude fraction by the following method.

An emulsion of carbon tetrachloride was prepared by stirring together 75 parts of water, 24 parts of carbon tetrachloride and 1 part of sodium dodecylbenzenesulphonate, which acted as an emulsifying agent. The emulsion was transferred to a suitable pressure vessel and the impure krypton-xenon mixture passed into the stirred emulsion. The stirring could be performed mechanically, or by shaking, or by the bubbling action of the gas alone. The gas was added until the pressure rose to 400 atma., the pressure vessel being cooled to −10° C. When equilibrium was attained, the supernatent gas which contained all the impurities was allowed to escape, the pressure falling to atmospheric. The temperature was then allowed to rise to 11.3° C., when the bulk of the krypton was evolved in the form of almost pure krypton containing only small quantities of xenon; this was pumped off into a suitable receiver. The temperature was then allowed to rise further to 14° C. when the xenon, mixed with some krypton, was evolved and pumped into a suitable receiver.

The xenon was recovered in a reasonably pure form by repeating the absorption in the water-carbon tetrachloride mixture and the fractional decomposition of the compounds formed.

This separation takes advantage of the differences in stability of the krypton and xenon compounds, $$CCl_4.2Kr.17H_2O$$

and $$CCl_4.2Xe.17H_2O$$

which decompose at 1 atma. pressure at temperatures of 11.3° C. and 13.7° C. respectively.

*Example 4*

This example illustrates the use of the double hydrate for the transport and storage of krypton.

A lightweight metal cylinder of 1 litre capacity fitted with a suitable valve and a corrosion-resistant lining was almost filled with 950 cc. of an emulsion of carbon tetrachloride in water prepared as in Example 3. The cylinder was then cooled to $-10°$ C. and krypton was pumped in until there was no further absorption, the cylinder contents being agitated by shaking during this period. About 30–40 litres of krypton could be absorbed in this way and stored or transported at temperatures below about 35° C. (95° F.). When a supply of krypton was required from the cylinder, it was only necessary to connect a suitable valve to the cylinder and ensure that the temperature was greater than 12° C. (54° F.).

An alternative method of transport and storage is to prepare a solid mass of the krypton-carbon tetrachloride double hydrate in a high-pressure vessel using a pressure of 400 atma. as described in Example 3. This crystalline mass, which contained about 120 litres of krypton per litre of compound, was transferred to a lightweight cylinder fitted with a suitable valve, and was ready for distribution. During storage or transit, the cylinder was maintained at a temperature in the region of 0° C. (32° F.), such as is easily obtained in small domestic or laboratory refrigerators.

This is a continuation-in-part of our copending application Serial No. 857,530, filed December 7, 1959, and now abandoned.

We claim:
1. Novel double hydrates of the formula:

$$B.2R.17H_2O$$

where B is a liquid chlorinated derivative of methane and R is a rare gas selected from the group consisting of argon, krypton and xenon.

2. The method of preparing a double hydrate of the formula:

$$B.2R.17H_2O$$

where B is a liquid chlorinated derivative of methane and R is a rare gas selected from the group consisting of argon, kryton and xenon, comprising bubbling the rare gas under pressure through an emulsion of the liquid chlorinated derivative of methane in water containing a small amount of an emulsifying agent, the emulsion being cooled to a temperature below the decomposition temperature of the compound at the pressure used but such that the emulsion remains sufficiently mobile to permit the rare gas to be bubbled therethrough.

No references cited.